US009473516B1

(12) United States Patent
Jezorek et al.

(10) Patent No.: US 9,473,516 B1
(45) Date of Patent: Oct. 18, 2016

(54) DETECTING NETWORK ATTACKS BASED ON A HASH

(71) Applicant: Amazon Technologies, Inc., Seattle, WA (US)

(72) Inventors: Matthew Ryan Jezorek, Maple Valley, WA (US); Maarten Van Horenbeeck, Seattle, WA (US); Richie Lai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 14/500,649

(22) Filed: Sep. 29, 2014

(51) Int. Cl.
*H04L 29/06* (2006.01)
(52) U.S. Cl.
CPC ............... *H04L 63/14* (2013.01); *H04L 67/42* (2013.01)
(58) Field of Classification Search
CPC .............................. H04L 63/14; H04L 67/42
See application file for complete search history.

(56) References Cited

U.S. PATENT DOCUMENTS

| 7,630,381 | B1 | 12/2009 | Roskind et al. |
| 8,121,902 | B1* | 2/2012 | Desjardins ......... G06Q 30/0282 705/26.1 |
| 8,296,291 | B1* | 10/2012 | Desjardins ......... G06Q 30/0603 705/27.2 |
| 8,312,543 | B1* | 11/2012 | Gardner ............. H04L 63/1416 726/22 |
| 8,347,394 | B1 | 1/2013 | Lee et al. |
| 2002/0124172 | A1* | 9/2002 | Manahan ............ H04L 63/0853 713/176 |
| 2003/0069974 | A1 | 4/2003 | Lu et al. |
| 2005/0289452 | A1* | 12/2005 | Kashi ................. G06F 17/2247 715/232 |
| 2006/0085735 | A1* | 4/2006 | Shimizu ............. G06F 17/2247 715/201 |
| 2006/0106802 | A1 | 5/2006 | Giblin et al. |
| 2007/0136657 | A1* | 6/2007 | Blumenthal ......... G06F 17/241 715/201 |
| 2008/0263627 | A1 | 10/2008 | Berteau et al. |
| 2008/0313157 | A1* | 12/2008 | Kim .................. G06F 17/30864 |
| 2009/0199083 | A1* | 8/2009 | Sar ........................ G06F 17/241 715/231 |
| 2009/0287706 | A1* | 11/2009 | Bourges-Waldegg .. H04L 63/06 |
| 2010/0050243 | A1 | 2/2010 | Hardt |
| 2010/0269174 | A1 | 10/2010 | Shelest et al. |
| 2010/0274970 | A1 | 10/2010 | Treuhaft et al. |
| 2010/0287196 | A1 | 11/2010 | Shields et al. |

(Continued)

OTHER PUBLICATIONS

U.S. Appl. No. 14/500,532, filed Sep. 29, 2014, Titled: Detecting Network Attacks Based on Network Requests.

(Continued)

*Primary Examiner* — Hadi Armouche
*Assistant Examiner* — Sher A Khan
(74) *Attorney, Agent, or Firm* — Kilpatrick Townsend & Stockton LLP

(57) ABSTRACT

Techniques for analyzing access to a network-based document may be provided. For example, a portion of the network-based document for hashing may be identified. A client hash of the portion may be accessed. The client hash may be based on an access of a client to the network-based document over a network. A provider hash of the portion may be also accessed. The provider hash may be based on a trusted version of the portion. The client hash and the provider hash may be compared. Based on the comparison, an issue associated with the access to the network-based document over the network may be detected.

20 Claims, 12 Drawing Sheets

(56) References Cited

U.S. PATENT DOCUMENTS

| | | | |
|---|---|---|---|
| 2011/0072262 A1* | 3/2011 | Amir | G06F 21/52 713/168 |
| 2011/0191849 A1* | 8/2011 | Jayaraman | H04L 63/1416 726/23 |
| 2011/0321139 A1* | 12/2011 | Jayaraman | G06F 21/51 726/4 |
| 2012/0210243 A1* | 8/2012 | Uhma | G06F 17/30893 715/744 |
| 2012/0218954 A1* | 8/2012 | Barbieri | H04L 5/003 370/329 |
| 2012/0254996 A1 | 10/2012 | Wilbourn et al. | |
| 2013/0054782 A1 | 2/2013 | Huang et al. | |
| 2013/0055358 A1 | 2/2013 | Short et al. | |
| 2013/0185793 A1* | 7/2013 | Jeong | H04L 63/1408 726/22 |
| 2013/0247183 A1* | 9/2013 | Kumar | G06F 21/554 726/22 |
| 2014/0040580 A1* | 2/2014 | Kripalani | G06F 3/065 711/162 |
| 2014/0215066 A1 | 7/2014 | Kamat et al. | |
| 2014/0215628 A1 | 7/2014 | Yan et al. | |
| 2014/0282905 A1 | 9/2014 | Iyer et al. | |
| 2015/0019708 A1 | 1/2015 | Denis | |
| 2015/0033109 A1* | 1/2015 | Marek | G06F 17/241 715/230 |
| 2015/0074397 A1* | 3/2015 | Dube | G06F 21/10 713/168 |
| 2015/0163236 A1 | 6/2015 | Niemela | |
| 2015/0220504 A1* | 8/2015 | Bocanegra Alvarez | G06F 17/241 715/233 |
| 2015/0295872 A1* | 10/2015 | Hawryluk | G06F 21/6245 715/752 |

OTHER PUBLICATIONS

U.S. Appl. No. 14/500,869, filed Sep. 29, 2014, Titled: Detecting Network Attacks Based on Network Records.

Evans, C. and C. Palmer, "Public Key Pinning Extension for HTTP," [online]. Internet Engineering Task Force (IETF), Dec. 9, 2011 [retrieved on Oct. 1, 2014]. Retrieved from the Internet: <URL: http://tools.ietf.org/html/draft-ietf-websec-key-pinning-01>.

* cited by examiner

DETECTING NETWORK ATTACKS BASED ON A HASH

CROSS-REFERENCE TO RELATED APPLICATIONS

This application is related to and incorporates by reference for all purposes the full disclosures of co-pending U.S. patent application Ser. No. 14/500,532, filed Sep. 29, 2014, entitled "DETECTING NETWORK ATTACKS BASED ON NETWORK REQUESTS", and co-pending U.S. patent application Ser. No. 14/500,869, filed Sep. 29, 2014, entitled "DETECTING NETWORK ATTACKS BASED ON NETWORK RECORDS".

BACKGROUND

More and more users are turning to network-based resources to access information and conduct transactions. For example, a web site of an electronic marketplace may allow users to review, order, and/or return items. Such an electronic marketplace may provide a user experience unmatched by a more traditional brick and mortar store. For example, the electronic marketplace may offer a larger and more diverse selection of items.

Typically, a user may operate a computing device to access a network-based resource of a provider over a network. An organization, such as Internet service provider (ISP), may facilitate this access by providing various services for routing traffic over the network between the user's computing device and the network-based resource. The services may be part of a domain name system (DNS) configuration. For example, DNS can allow a translation between a domain name input at the computing device and a network address of the network-based resource.

BRIEF DESCRIPTION OF THE DRAWINGS

Various embodiments in accordance with the present disclosure will be described with reference to the drawings, in which.

DETAILED DESCRIPTION

Figure 1:
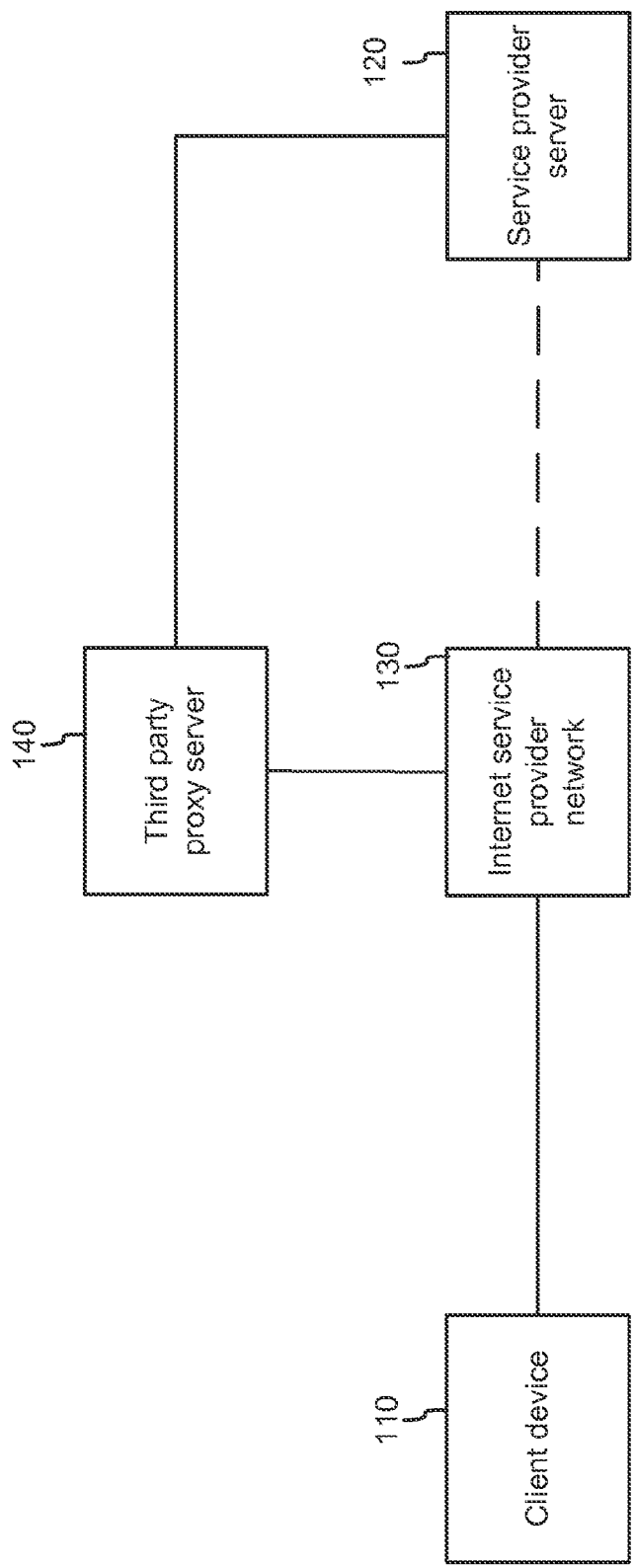
FIG. 1 illustrates an example computing system for accessing a network-based resource, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing a user's experience when, for example, accessing a network-based resource. Typically, a user assumes that a safe network connection may exist between the user's computing device and the network-based resource. However, this may not always be the case. For example, an organization may sit in between the user's computing device and the network-based resource to facilitate the network connection. This organization may route traffic addressed to the network-based resource to a third party resource that, in turn, may redirect the traffic to the network-based resource. This change in the network path may allow the third party to inject malware or some other unwanted code or malicious software in the traffic. A provider of the network-based resource may implement various techniques to detect whether such a change may have occurred and may, accordingly, take corrective actions. For example, the provider may monitor and analyze the network path to detect whether an undesirable change may exist. If so, the provider may flag the user's computing device as an at risk device. When a large enough number of user computing devices are flagged, the provider may further analyze the corresponding network paths and identify the third party. To analyze a network-path, the provider may receive information about this path from a corresponding user device or from the network-based resource. For example, the provider may configure the user computing device and/or the network-based resource to record and provide such information.

To illustrate, WebsiteABC.com may be an apparel web site supporting affiliate marketing. An affiliate, wanting to take advantage of the affiliate marketing, may agree with an ISP to route traffic addressed to the web site to the affiliate's proxy server. In turn, the proxy server may redirect the traffic to the web site. In this way, traffic to the web site would appear to have been caused by the affiliate thus unjustifiably rewarding the affiliate for the traffic. Evelyn, a fashion enthusiast, may operate her computing device to review and order certain clothing articles from the web site. Evelyn may believe that she is safely traveling to the web site when, in fact, that may not be the case. A provider of the web site may update the code of the web site and/or an application on Evelyn's computing device to provide information about the network-path. For example, the update may cause the computing device to submit web requests to a trusted web page, DNS requests to a domain name of the web site, and/or hash of a portion of the web site. The provider may access and analyze the resulting information to detect an undesirable change. For example, the provider may determine whether a referrer header exists in a web request when it should not, a DNS record associated with the affiliate's proxy server, and/or a hash that may indicate an unauthorized change to the portion of the web site.

As such, by detecting undesired changes and implementing corrective actions, a provider may enhance a user's experience. This may include providing a safer and more secure access to an associated network-based resource and potentially protecting against malicious software injection.

In the interest of clarity of explanation, the embodiments are described in the context of a web site, an administrator of the web site, an ISP, a third party, and DNS. Nevertheless, the embodiments may not be limited as such. Instead, the embodiments may similarly apply to any network-based resource (e.g., a public web site, an intranet, an electronic marketplace, a data center, virtual machine, a hosting computing environment, or any other network-based resource), a service provider of the network-based resource (e.g., an administrator, an authorized entity, a provider of a service over a network, or any other service provider), an organization that may facilitate access to the network-based resource over a network (e.g., an ISP, access providers, mailbox providers, or other organizations), an unauthorized party that may alter the access (e.g., an affiliate, a hacker, or any party not authorized by the service provider), and a hierarchy for a distribute computing environment (e.g., DNS, a protocol suite for accessing a network-based resource over a network, or any other hierarchy).

Turning to FIG. 1, that figure illustrates an example computing environment for providing access to a network-based resource of a service provider, such as a web site managed by an administrator associated with the service provider. In particular, a client device 110 may access the web site over a network, such as the Internet. The client device 110 may be any computing device configured to remotely access the web site and may be provided by or can be independent of the service provider. An example of the client device 110 is further illustrated in FIGS. 2 and 5.

The web site may be hosted on a service provider server 120 of the service provider. The service provider server 120 may include one or more web servers, or some other computing devices configured to host a network-based resource. An example of the service provider server 120 is further illustrated in FIG. 2. In the interest of clarity of explanation, FIG. 1 illustrates a single service provider server 120. However, this service provider server 120 may represent a plurality of servers, computing devices, network devices, and/or associated hardware and software modules. These various components may form one or more autonomous systems (AS) associated with one or more autonomous system numbers (ASNs).

The web site may be accessible to the client device 110 over a network through a network address (e.g., an Internet address such as a uniform resource locator (URL)). An example of the web site is further illustrated in FIG. 4. The web site may also include a set of web pages typically served from a same domain. The domain may have a name (e.g., a domain and/or a host name) that can specify a location of the web site, such as on the service provider server 120. The name may follow a DNS hierarchy configured to name network-based resources connected over a network. DNS can typically translate a user-inputted address of the web site entered at the client device 110 (e.g., a human-readable web address such as URL) to a network-based address (e.g. a machine-readable address, such as an Internet protocol (IP) address). A web page of the web site may be an example of a network-based document. Typically, the web page can be written in a programming language such as HTML, XML, or some other language. To access the web page, the client device 110 may include a browser or some other application that can submit requests to the web page, such as web requests. A web request can include hypertext transfer protocol (HTTP), which can be optionally encrypted (HTTPS).

The client device's 110 access to a network, such as the internet, and ultimately to the web site may be facilitated by an ISP. The ISP may operate an ISP network 130 configured to provide such access. This network may include various servers, computing devices, network devices, and/or associated hardware and software modules. For example, the ISP network 130 can include recursive and caching name servers configured to cache DNS data. The cached data can include IP addresses and corresponding names (e.g., domain and/or host names).

As such, when a URL address is inputted at the client device 110, a browser or some other application of the client device 110 may first determine from local DNS cache if a corresponding IP address is available. If not, the client device 110 (e.g., the browser or the other application) may submit a DNS query to the ISP network 130 (e.g., to a recursive DNS server). In turn, the ISP network 130 may return the IP address if available from cache. Otherwise, the DNS query can be further submitted to a root name server, a top-level domain (TLD) name sever, and/or an authoritative name server as needed. In this case, the returned IP address can be stored in cache of the ISP network 130 (e.g., in the cache of the recursive DNS server) and provided to the client device 110. When the IP address is available to the client device 110, the client device 110 (e.g., the browser or the other application) can access the web site and receive one or more web pages.

As further illustrated in FIG. 1, a third party may operate a third party proxy server 140 to alter the access of the client 110 to the web site. For example, instead of accessing the web site directly from the service provider server 120 (shown with a dotted line), the network path can be altered to go through the third party proxy server 140. This change can be unauthorized, or at least undesired. For example, the administrator of the website and/or a user of the client device 110 may be unaware of the change. As a result, the third party proxy server 140 can be seen as sitting between the client device 110 and the service provider server 120 and allowing the third party to inject unauthorized or undesired code in the traffic between the client device 110 and the service provider server 120.

The third party can carry out the above change based on the DNS cache of the ISP network 130. For example, the third party and the ISP may agree to change the cached DNS data. In another example, the third party may, without authorization from the ISP, access (e.g., hack) and change the cached DNS data. The change, whether or authorized or not, can include an update or edit to the cached DNS data such that a name (e.g., domain and/or host name) of the web site may be translated to an IP address different from the IP address of the web site. This altered IP address can be for a third party web site hosted on the third party proxy server 140 and can provide various malicious or unauthorized functions to the third party. For example, one function may include redirecting traffic to the web site of the service provider. This can be the case when, for instance, the third party is an affiliate desiring to take unjustifiable advantage of an affiliate marketing program as explained herein above. In another example, one function may include inserting unauthorized or malicious code. The severity of the inserted code can vary. For instance, the inserted code may include a cookie indicating that the client device 110 has been redirected. Additionally or alternatively, the inserted code may include HTML code, a script, an object, or some other code configured to monitor credentials of the user (e.g., username and password) when logging into a web page of the web site. In yet another example, one function may include spoofing rather than redirecting to the web site. For instance, the third party web site can be configured to look and feel like the web site of the service provider. Alternatively, the third party web site can look completely different, include a competitor's web site, or redirect to a competitor's web site.

Figure 2:
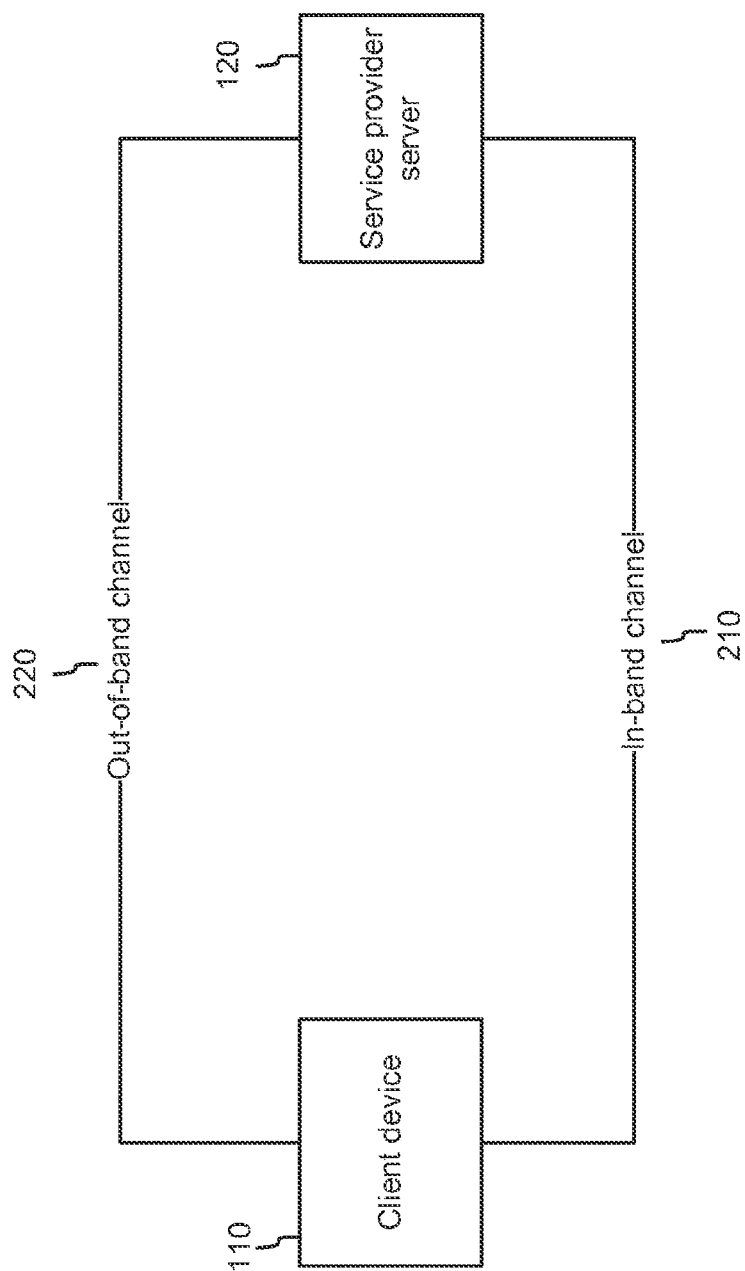
FIG. 2 illustrates example network paths between a client device and a network-based resource, according to embodiments.
Figure 4:
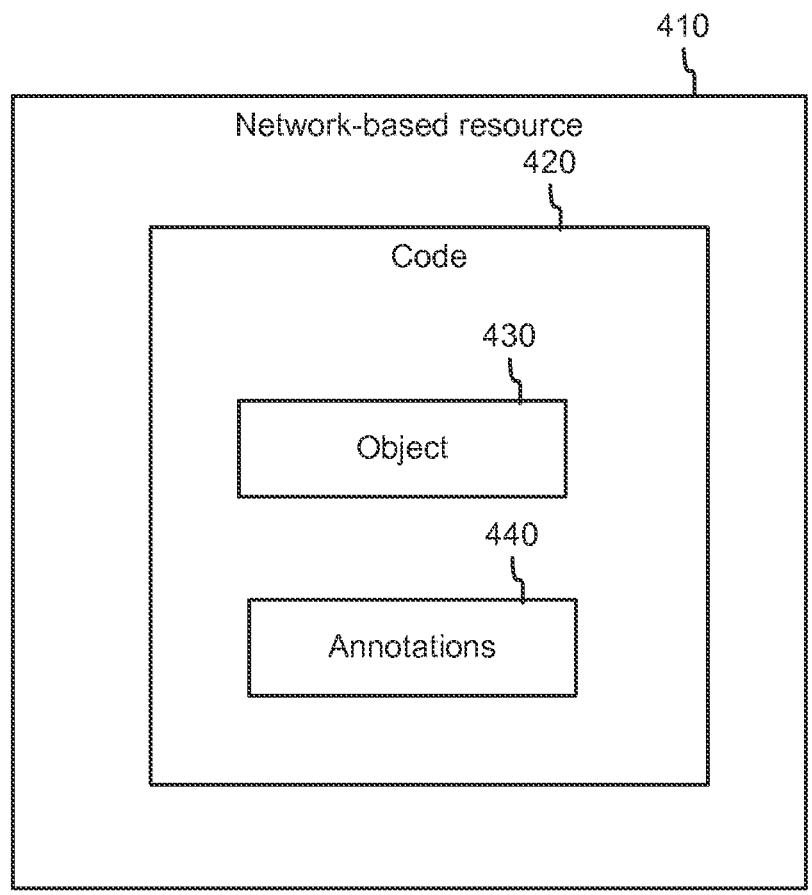
FIG. 4 illustrates an example network-based resource configured to facilitate detection of a change associated with accessing the network-based resource, according to embodiments.
Figure 5:
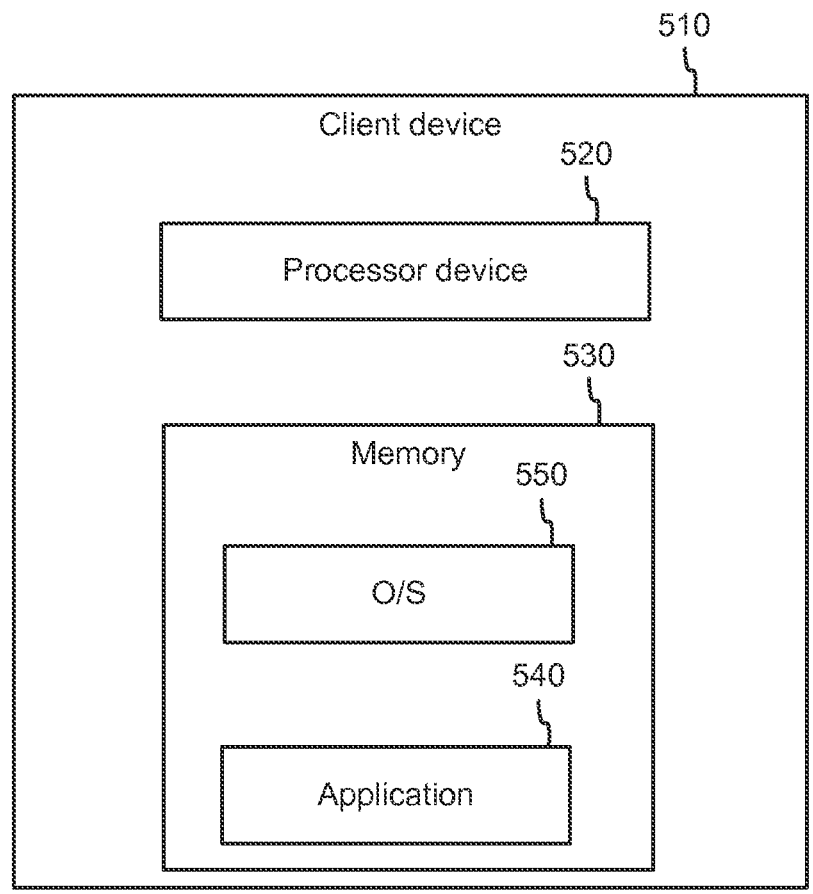
FIG. 5 illustrates an example client device configured to detect a change associated with accessing a network-based resource, according to embodiments.

To detect the above unauthorized changes, the administrator or the service provider may implement various or a combination of techniques. For example, information about web requests to the web site may be accessed and analyzed. In another example, information from the cached DNS data, such as various DNS records, may be accessed and analyzed. In yet another example, a hash of a predefined portion of the web site may be accessed and analyzed. The choice to implement one technique or combination of techniques can depend on multiple parameters. One parameter may include the type of change. For example, web requests can be used to detect redirection. In comparison, using DNS records can be used to detect redirection and/or spoofing. Another parameter may include the type of association between the client device 110 and the administrator. For example, if the administrator is able to configure the client device 110 as a sensor for detecting unauthorized changes, DNS records or hashes of the portion of the web site can be used. However, if this option is unavailable, web requests can be used. FIGS. 2, 4, and 5 illustrate example computing system embodiments to implement these various techniques.

As such, by implementing any or a combination of the above techniques, the administrator can detect undesired changes, implement corrective actions, and thereby provide a safer and more secure access. In particular, the administrator can detect when the client device 110 travels a path to the web site that may be undesirable and/or if DNS records of the website (or of any other monitored web site) are being modified. Based on the detection, the administrator can determine that the client device 110 may be an at risk device or that the third party may be an abuser, can void the third party traffic, and/or can determine patterns across multiple client devices indicative of an issue associated with accessing the web site.

Turning to FIG. 2, that figure illustrates example network paths between a client device and a network-based resource. One of the parameters considered when choosing a technique for detecting a change associated with accessing the network-based resource may include the type of available network path.

More particularly, a first network path may include an in-band channel 210 and a second network path may include an out-of-band channel 220. Generally, the in-band channel 210 may represent a network path to a publicly accessible network-based resource(s) of the service provider server 120. This network-based resource may represent a publicly available data plane that can include, for example, certain public web pages of a web site. In comparison, the out-of-band channel 220 may represent a network path to a privately accessible network-based resource of the service provider server 120. In this case, the network-based resource may represent a control plane that can include, for example, other web pages of the web site or a platform for providing control and other functions from the service provider server 120 to the client device 110. As such, the out-of-band channel 220 may allow the service provider or an administrator of the service provider server 120 to control and provide certain functions of the client device 110, such as to download software updates, remote access, and other functions. Because of this control, the out-of-band channel 220 may be available to the service provider or the administrator when the client device 110 (e.g., hardware and/or software components) and/or associated services are designed, supplied, and/or provided by the service provider.

If only the in-band channel 210 is available, the service provider (or administrator) may configure an accessed network-based resource (e.g., a public web site) to cause the client device 110 to perform certain actions, such as submitting web requests, submitting DNS queries, and/or hashing a portion of the web site. This configuration can include updating the code of, for example, the public web site or certain web pages to include annotations, a script, an object, or some other code that, upon use on the client device 110, cause the actions. An example of this configuration is further illustrated in FIG. 4.

If the out-of-band channel 220 is available, a similar configuration of the network -based resource may be implemented. Additionally, or alternatively, the service provider (or administrator) may configure the client device 110 through the control plane to perform the actions independent of and/or in conjunction with the configuration of the network-based resource. For example, the client device 110 may run an application in the background configured to perform some or all of the actions and transmit resulting information to the control plane. An example of this configuration is further illustrated in FIG. 5.

In some examples, the client device 110 may be any type of computing devices such as, but not limited to, a mobile phone, a smart phone, a personal digital assistant (PDA), a laptop computer, a thin-client device, a tablet PC, a virtual machine, etc. In one illustrative configuration, the client device 110 may contain communications connection(s) that allow the client device 110 to communicate with the service provider server 120 over a network. As explained herein above, the communication connection can include an in-band channel and, depending on the association with the service provider, an out-of-band channel. The client device 110 may also include input/output (I/O) device(s) and/or ports, such as for enabling connection with a keyboard, a mouse, a pen, a voice input device, a touch input device, a display, speakers, a printer, etc.

The service provider server 120 may, in some examples, provide network-based resources such as, but not limited to, applications for purchase and/or download, web sites, web hosting, client entities, data storage, data access, management, virtualization, etc. The service provider server 120 may also be operable to provide web hosting, computer application development, and/or implementation platforms, or combinations of the foregoing to the client device 110.

The service provider server 120 may be any type of computing device such as, but not limited to, a mobile phone, a smart phone, a personal digital assistant (PDA), a laptop computer, a desktop computer, a server computer, a thin-client device, a tablet PC, etc. The service provider server 120 may also contain communications connection(s) that allow service provider server 120 to communicate with a stored database, other computing devices or server, client devices, and/or other devices on a network. The service provider server 120 may also include input/output (I/O) device(s) and/or ports, such as for enabling connection with a keyboard, a mouse, a pen, a voice input device, a touch input device, a display, speakers, a printer, etc.

Additionally, in some embodiments, the service provider server 120 may be executed by one more virtual machines implemented in a hosted computing environment. The hosted computing environment may include one or more rapidly provisioned and released network -based resources. Such network-based resources may include computing, networking, and/or storage devices. A hosted computing environment may also be referred to as a cloud computing environment. In some examples, the service provider server 120 may include one or more servers, perhaps arranged in a cluster, or as individual servers not associated with one another.

In one illustrative configuration, the service provider server 120 may include at least one or more processing units (or processor devices(s)) and one memory. The processor device(s) may be implemented as appropriate in hardware, computer-executable instructions, firmware, or combinations thereof. Computer-executable instruction or firmware implementations of the processor device(s) may include computer-executable or machine-executable instructions written in any suitable programming language to perform the various functions described.

The memory may store program instructions that are loadable and executable on the processor device(s), as well as data generated during the execution of these programs. Depending on the configuration and type of the service provider server 120, the memory may be volatile (such as random access memory (RAM)) and/or non-volatile (such as read-only memory (ROM), flash memory, etc.). The service provider server 120 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

Additionally, the computer storage media described herein may include computer -readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer -readable media does not include computer-readable communication media.

Figure 3:
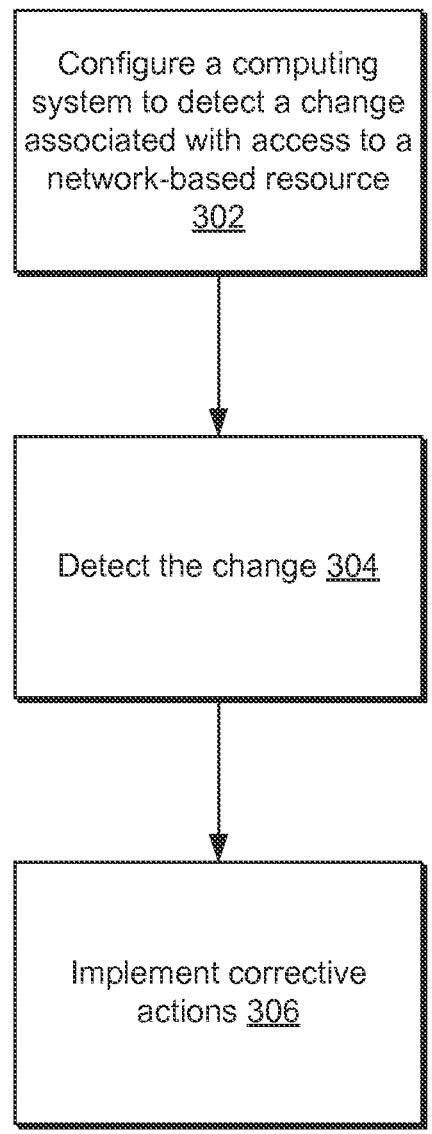
FIG. 3 illustrates an example flow for detecting a change associated with accessing a network-based resource, according to embodiments.

Turning to FIG. 3, that figure illustrates and example flow for detecting a change associated with accessing a network-based resource. More detailed example flows are further described in FIGS. 6-7. Operations of the example flow of FIG. 3 may be further embodied in operations of the example flows of FIGS. 6-7. Thus, some operations may be similar. Such similarities are not repeated herein in the interest of clarity of explanation.

Further, in the illustrative operations, each of the operations or functions may be embodied in, and fully or partially automated by, modules executed by one or more processor devices of a computing device. Depending on the device implementation, as further illustrated FIGS. 4 and 5, the computing device may include one or more of the client device 110 or the service provider server 120. Further, while the operations are illustrated in a particular order, it should be understood that no particular order is necessary and that one or more operations may be omitted, skipped, and/or reordered.

The example flow of FIG. 3 may start at operation 302, where a service provider of a network-based resource may configure a computing system to detect a change associated with access to the network-based resource. In an example and as described herein above, the network -based resource may include a web site or some other resource available to client devices over a network. The computing system may include a computing resource of the service provider, such as a web server or some other computing device. In this case, configuring the computing system may involve configuring the network-based resource (e.g., the web site, a set of the associated web page, or a home page) to cause the client device to perform certain actions. FIG. 4 illustrates and example of this configuration. The actions may include, for example, submitting web requests, DNS requests, and/or hashing portions of the network-based resource (e.g., a certain portion of the web site or of a web page). If an out-band-channel is available to a client device, the computing system may additionally or alternatively include the client device. In this case, the client device may perform some or all of the actions independently of or in conjunction with the configuration of the network-based resource.

At operation 304, the service provider may detect an undesirable or unauthorized change associated with the access to the network-based resource. This change may indicate an issue with the access. For example, the change may indicate an undesirable path to the web site or to any other monitored web site or an unauthorized change to DNS records associated with the web site or with the other monitored web site. To do so, the service provider may configure a detection service to analyze information associated with the access. For example, the detection service may be implemented within the computing system (e.g., on a computing device of the service provider) to obtain information from the computing system (e.g., another computing device of the service provider and/or the client device depending on the computing system configuration at operation 302). This information may include results of the performed actions, such as data associated with web requests (e.g., referrer header, 302 messages, cookies, and/or other web request data), data associated with DNS requests (e.g., DNS records including address records, name server records, and/or other DNS request data), data associated with hashing a portion of the web site or web page(s) (e.g., a hash of annotated or un-annotated fields), and/or other action-related data. The detection service may then compare the information to other similar information obtained from trusted sources or through more secure processes. If mismatches exist, or if mismatches violate certain conditions, the detection service may detect that an issue may exist.

At operation 304, the service provider may implement corrective actions. For example, the service provider can configure the detection service to flag any client device that may have an issue associated with accessing the net-work-based resource. A flagged client device may be considered as an at risk device. If multiple flagged client devices are associated with an issue caused by a particular third party, the detection service may flag the third party as an abuser. Traffic from a flagged third party may be void. Additionally or alternatively, client devices affected by a flagged third party may be subject to fraud monitoring and prevention, Further, the detection service may analyze information across multiple client devices and/or third party to detect patterns (e.g., issues within a geographic region, a domain zone, associated ISPs, corresponding type and scope of unauthorized change, or other patterns) to implement further corrective actions.

Turning to FIG. 4, that figure illustrates an example network-based resource 410 configured to facilitate detection of a change associated with accessing the network-based resource. The network-based resource 410 may include a web site. In turn, the web site may include a set of web pages written using code 420, such as HTML, XML, or another code. The code 420 may be edited by, for example, an administrator of the web site to include an object(s) 430 and annotations 440. In an example, the object 430 and/or annotations 440 may be associated with a particular page (e.g., included in the HTML code of a home page), with a subset of the web pages, or with all of the web pages.

The object 430 may include one or more objects, such as a HTML headers and tags, a script using javascript, a flash object, and/or some other coded object, configured to cause a client device, when using the one or more objects, to perform certain actions. These actions may depend on the object 430 and optionally on the annotations 440, and can include, for example, web requests, DNS requests, and hashing actions.

The annotations 440 can be configured to support the client device performing the actions as defined by the object 430. For example, the annotations can facilitate hashing particular, but not all portions of the web site (or applicable web pages). To illustrate, a web page (e.g., a home page) presented to a user at a client device can be customized based on user preferences or history (e.g., as stored in a cookie). As such, this home page may vary between users. Hashing the entire HTML code of the home page would result in a different hash depending on the user. Using such hashes to detect whether an unauthorized or undesired change may exist may not be useful because the hashes may vary. Instead, the annotations 440 may annotate portions of the home page (e.g., corresponding HTML code) that should not change depending on the user. This may include, for example, static portions of the home page such as a banner section, a login field, and/or other portions. Additionally or alternatively, the annotations 440 may annotate portions of the home page that should otherwise change. When hashing the home page as defined by the object 430, a client device may determine based on the annotations 440 which portions of the home page should be hashed (e.g., the portions that should not change) and may accordingly hash these portions. As such, hashes across the users should be the same. If a hash varies, that variance can indicate an undesired or unauthorized change (e.g., a third party inserting additional HTML code into the code of the home page provided to a client device).

As such, when a client device (e.g., a browser running on the client device) accesses the network-based resource 410 (e.g., the configured web site), and receives the code 420 (e.g., the code of certain web page(s) including the object 430 and/or the annotations 440), the client device may also use, execute, or run the object 430 to perform certain actions based on or independently of the annotations 440. In an example, the object 430 can be configured to cause the client device to submit a web request to a web page. The web page may be set-up for the purpose of facilitating the detection of redirection while not being useful for other purposes. In other words, this web page may be predefined based on various parameters including traffic and redirection. For instance, the web page may be hosted on a dedicated web server or may be set -up such that traffic to the web site may be minimally impacted by the web request. This set-up can be important if a large number of client devices submit web requests. Further, the web page may be set such that third parties should not redirect traffic to the web page. This can be achieved by implementing a combination of techniques to minimize a likelihood of client devices being redirected to the web page. For instance, the administrator may hide the web page (e.g., not advertise the web page to affiliates), may disable web crawling to the web page, may change the address of the web page at time intervals, and/or may set-up the web page to include random or un-useful content (e.g., a blank page). The web request may include an HTTP request that can be analyzed to determine whether, for instance, redirection exists. For instance, if a redirection to the web page is caused by a third party, the HTTP request should include a referrer header and/or a 302 status. By analyzing a log recorded by the web server hosting the web page, a detection service may determine that a referrer header exists and, thus, that an issue may exist. Similarly, by analyzing received information about a 302 status, the detection service may detect that an issue may exist.

In another example, the object 430 can be configured to cause the client device to submit a DNS request. This request can be submitted to a name server of an applicable ISP. The name server may return various DNS records including address records, name server records, and/or other DNS request data to the client device. In turn, the client device can locally store and/or transmit the information to a computing device of the service provider over, for example, an out-of-band channel. A detection service implemented on the client device and/or the service provider computing device may access and analyze the information to detect whether an issue may exist. For instance, if the DNS records indicate an address of a computing resource other than the one of the service provider which may be hosting the network-based resource 410, the detection service may determine that an issue may exist. Similarly, an issue may exist if the detection service determines a mismatch between a host name and a domain name from the DNS records or if such names resolve to any ASN other than an ASN of the service provider. Further, the detection service may compare the DNS records against similar records obtained through a DNS request to a trusted name server. Again, if mismatches exist, the detection service may determine that an issue may exist.

In another example, the object 430 can be configured to cause the client device to submit a hash of a portion of the network-based resource. For instance, based on the annotations 440, the client device may hash an annotated portion (or un-annotated portion depending on the configuration) of the code 420. The client device can locally store and/or transmit the hash to a computing device of the service provider over, for example, an out-of-band channel. A detection service implemented on the client device and/or the service provider computing device may access and analyze the hash to detect whether an issue may exist. For instance, the detection service may compare the hash to another trusted or verified hash of the same portion of the code 420. If there are mismatches, the detection service may determine that an issue may exist.

As such, by configuring the network-based resource 410 to include the object 430 and annotations 440, a service provider may turn client devices accessing the network-based resources 410 effectively into sensors that may collect information about potential issues associated with access to the network-based resource 410. In another configuration, the service provider may configure client devices to act as such sensors without requiring the configuration of the network-based resource 410 of FIG. 4. An example of this client device configuration is further illustrated in FIG. 5. Nevertheless, the configuration of the network-based resource 410 of FIG. 4 and the configuration of a client device of FIG. 5 may also be used in conjunction.

Turning to FIG. 5, that figure illustrates an example client device 510 configured to detect a change associated with accessing a network based resource. This client device configuration can support detecting whether the change may exist independently of or in conjunction with objects and annotations that may be implemented at the network-based resource. In particular, the client device 510 may execute an application 540 configured to perform various actions including, for example, collecting information about the change. The application 540 may interface, integrate, or be part of a detection service configured to analyze the information to determine whether the change may exist and accordingly detect a related issue. In an example, the application 540 may include a browser, a browser plug-in, or an application independent of a browser. For instance, the application 540 may be included in an operation system 550 of the client device 510. Further, the application 540 can be triggered to perform one or more of the actions in association with an access to the network-based resource. Additionally or alternatively, the application 540 may do so independently of this access. For instance, the application 540 can run in the background and can, at time intervals, perform the one or more actions. The application 540 can be available on the client device 510 at a time prior to a user obtaining the client device 510, or can be installed on the client device 510 after such a time from a data store of the service provider. The service provider may further push updates and other information to the application 540 from time to time over, for example, an out-of-band channel.

In particular, the application 540 may be configured to perform one or more web requests, DNS request, or hashing a portion of the network-based resource, similar to the actions described in connection with FIG. 4. The resulting information can be reported to a computing device of the service provider and/or locally analyzed to detect whether an issue exists based on various parameters. These parameters include, for example, the performed action, the interface to a detection service, and an availability of an out-of-band channel.

For example, if a web request is performed, a referrer header may be logged by a hosting server of the service provider. As such, it may be sufficient to implement a detection service at a computing device of the service provider to analyze the referrer header and detect an issue. Additionally or alternatively, the application 540 (or a local detection service) may analyze whether the web request includes a 302 status and, if so, may detect that an issue exist. Similarly, the 302 status or the result of the local detection may be reported to a detection service of the service provider over an out-of-band channel.

In another example, if a DNS request is performed, the client device may report information about collected DNS records to a computing device of the service provider over, for instance, an out-of-band channel. In turn, a detection service implemented on the service provider computing device may analyze this information and determine whether an issue may exist. Additionally or alternatively, the application 540 may receive over, for instance, the out -of-band channel trusted information about trusted DNS records and/or a set of conditions. The application 540 (or a local detection service) may compare the trusted information with the collected information. If there are mismatches, an issue may be detected. Similarly, the collected information can be compared against a condition. For instance, if the collected DNS records indicate a mismatch between a host name and a domain name or if such names resolve to any ASN other than an ASN of the service provider, an issue may be detected. If an issue is detected locally, the client device 510 may report the issue to a computing device of the service provider over, for example, the out-of-band channel.

In another example, if a hashing is performed, the client device may report information about the hash to a computing device of the service provider over, for instance, an out-of-band channel. In turn, a detection service implemented on the service provider computing device may compare this hash to a trusted hash to determine whether an issue may exist. Additionally or alternatively, the application 540 may receive over, for instance, the out-of-band channel a trusted hash. The application 540 (or a local detection service) may compare the generated hash to the trusted hash. If there are mismatches, an issue may be detected. Similarly, instead of receiving the trusted hash over the out-of-band channel, this hash may be embedded in the code of the network-based resource. In this case, the application 540 (or a local detection service) can retrieve the trusted hash directly from the network-based resource (e.g., over an in-band channel) to perform the comparison. If an issue is detected locally based on the hash comparison, the client device 510 may report the issue to a computing device of the service provider over, for example, the out-of-band channel.

As such, by configuring the computing device 510 to include the application 540, a service provider may turn the client device effectively into a sensor to collect information associated with accessing a network-based resource. The service provider may collect such information from a large number of computing devices 510 continuously, at time intervals, or intermittently. The collected information can be analyzed to detect patterns and implement corrective actions accordingly.

In some examples, the client device 510 may be any type of computing devices including, for instance, some or all of the components of the client device 110. The client device 510 may include at least one or more processing units (or processor device(s)) 520 and one memory 530. The processor device(s) 520 may be implemented as appropriate in hardware, computer-executable instructions, firmware, or combinations thereof. Computer-executable instruction or firmware implementations of the processor device(s) 520 may include computer -executable or machine-executable instructions written in any suitable programming language to perform the various functions described.

The memory 530 may store program instructions that are loadable and executable on the processor device(s) 520, as well as data generated during the execution of these programs. Depending on the configuration and type of client device 510, the memory 530 may be volatile (such as random access memory (RAM)) and/or non-volatile (such as read-only memory (ROM), flash memory, etc.). The client device 510 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 530 may include multiple different types of memory, such as static random access memory (SRAM), dynamic random access memory (DRAM), or ROM.

Turning to the contents of the memory 530 in more detail, the memory may include the operating system (O/S) 550 one or more application programs or services for implementing the features disclosed herein including the application 540. In some examples, the client device 510 may be in communication with computing resources of the service provider via a network. The network may include any one or a combination of many different types of networks, such as cable networks, the Internet, wireless networks, cellular networks, and other private and/or public networks. It is noted that the described techniques may also apply in other client/server arrangements (e.g., set-top boxes, etc.), as well as in non-client/server arrangements (e.g., locally stored applications, peer-to-peer systems, etc.).

Figure 6:
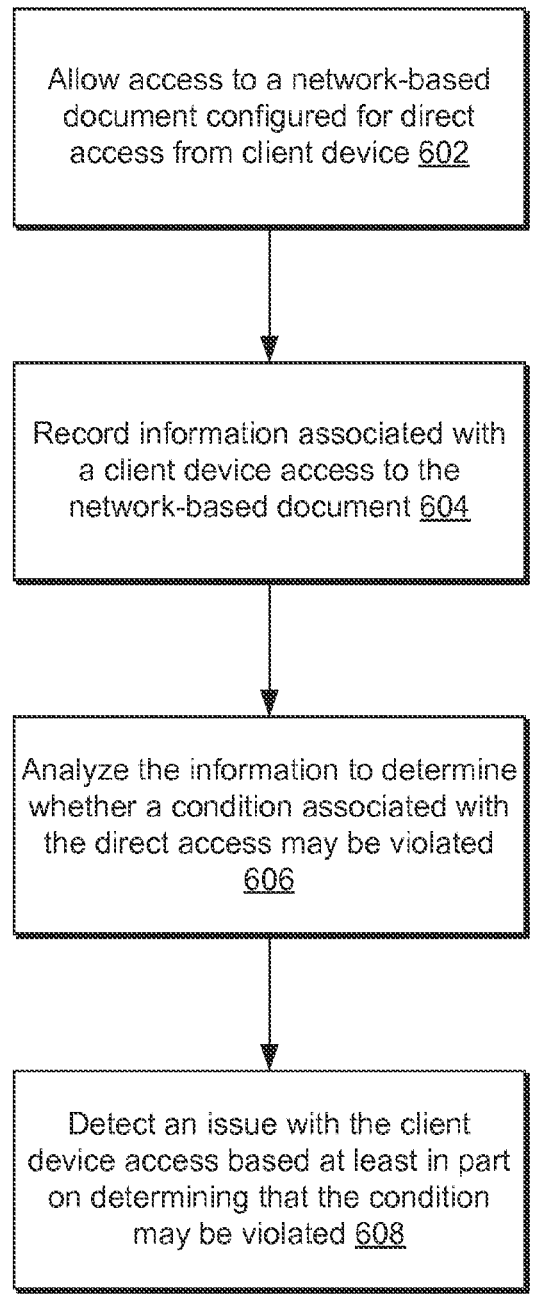
FIG. 6 illustrates an example flow for using a network-based request to detect a change associated with accessing a network-based resource, according to embodiments.
Figure 7:
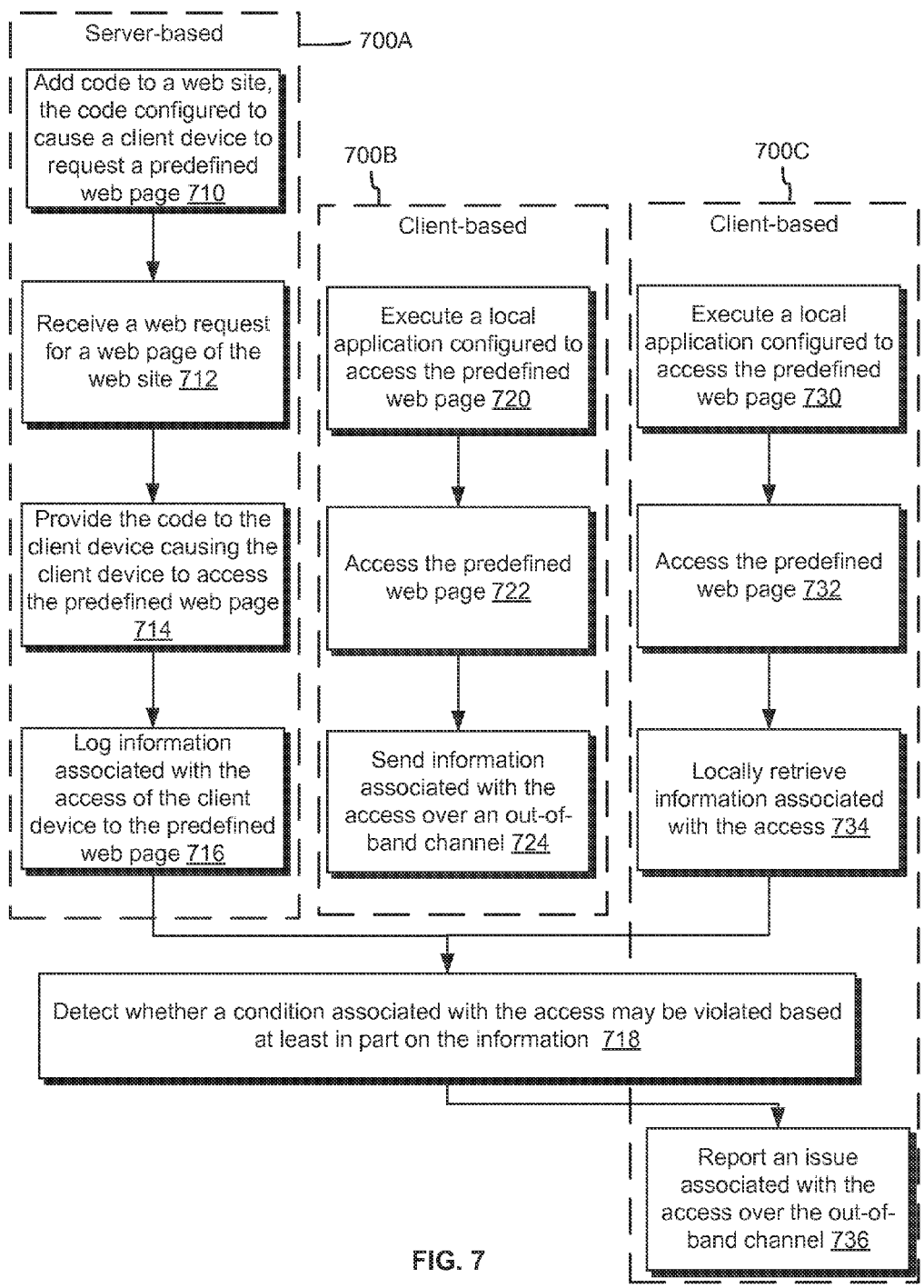
FIG. 7 illustrates an example flow for using a network-based request by a client device or a network-based resource to detect a change a change associated with accessing a network -based resource, according to embodiments.

Turning to FIGS. 6-7, those figures illustrate example flows for using a network-based request to detect a change associated with accessing a network-based resource. FIG. 6 illustrates an example high-level flow for using network-based requests. In comparison, FIG. 7 illustrates more detailed example flow for using web requests. Operations of the example flow of FIG. 6 may be further embodied in operations of the example flow of FIG. 7. Thus, some operations may be similar. Such similarities are not repeated herein in the interest of clarity of explanation.

Further, in the illustrative operations, each of the operations or functions may be embodied in, and fully or partially automated by, modules executed by one or more processor devices of a computing device. For example, a detection service executed on a service provider computing device, on a client device, or distributed between the service provider computing device and/or the client device is illustrated as performing certain operations of the flows. Nevertheless, other or a combination of other services and modules may be additionally or alternatively used. Also, while the operations are illustrated in a particular order, it should be understood that no particular order is necessary and that one or more operations may be omitted, skipped, and/or reordered.

The example flow of FIG. 6 may start at operation 602, where an administrator of a network-based resource may configure the network-based resource such that the configuration may allow direct access for a client device to a network-based document of the network-based resource. For example, the network-based resource may include a web site and the network-based document may include a web page. The web-page may be predefined based on various parameters including traffic and redirection as described herein above in connection with FIG. 4. The direct access may represent setting-up the web page such that the client device, absent any undesirable or unauthorized change, should access the web-page without being redirected. Allowing the access may include configuring the web site with an object (e.g., a script written using javascript) such that, when the web site (e.g., a home page) is accessed by the client device (e.g., a web browser), the client device would also run the object and accordingly access the pre-defined web page. Additionally or alternatively, allowing the access may include configuring an application on the client device such that, in conjunction with or independent of accessing the web site, the application can request and access the pre-defined web page. This may include the application receiving, for example an address of the web page over an out-of-band channel, and/or retrieving the address based on accessing the web site. In either case, accessing the web page may involve submitting a network-based request, such as a web request, to a web server hosting the predefined web page.

At operation 604, information associated with the client device access to the network-based document may be recorded. For example, upon receiving the network-based request to the pre-defined web page, the web server may log the request. Similarly, upon submitting the network-based request, the client device may record data associated with the network-based request, such as any referrer header and/or 302 status. This recorded data may be transmitted to a detection service implemented on a service provider computing device and/or used by a locally implemented detection service.

At operation 606, a detection service may analyze the information associated with the client device access to the network-based document to determine whether a condition associated with the direct access may be violated. For example, the detection service may parse the recorded information to determine whether certain data exists (e.g., a referrer header and/or 302 status exists). The condition may define that no such data exists. That is because the web-page may have been set-up to avoid redirection. If such data (e.g., a referrer header and/or a 302 status) is found, the detection service may determine that the condition may be violated.

At operation 608, the detection service may detect an issue with the client device access based at least in part on determining that the condition may be violated. For example, if the condition is violated, the detection service may determine that there may have been a redirection to the network-based document when in fact there should not have been one. This may indicate an issue involving a third party redirecting traffic. The detection service may flag the client device as an at risk device, causing a corrective action. Further, the detection service may further analyze the recorded data (e.g., to retrieve a URL associated with the third party from a found referrer header), causing additional analysis to identify the third party.

Turning to FIG. 7, that figure illustrates another example flow for using network-based requests. The illustrated flow describes examples of web requests and is broken in three sub-flows indicated by the dashed lines. Sub-flow 700A illustrates various computing components of a service provider, such as a detection service, that may perform the related operations. In comparison, sub-flows 700B and 700C illustrate various computing components of a client, such as a detection service, that may perform the related operations. Sub-flows 700A-C may be performed independently of each other or in conjunction.

The example sub-flow 700A may start at operation 710, where code configured to cause a client device to request a predefined web page may be added to a web site. The code may include an object as illustrated in FIG. 4. For example, an administrator of the web site may add this object as a script using javascript.

At operation 712, a web request for a web page of the web site may be received. For example, the web request may include an HTTP request from the client device to access a home page, or some other page, of the web site.

At operation 714, the code may be provided to the client device causing the client device to access the predefined web page. For example, in response to the HTTP request, the requested web page along with the code may be transmitted to the client device. When the client device (e.g., a web browser) renders the requested web page, the code may also be run. This may cause the client device (e.g., the web browser) to also access and retrieve the predefined web page. For example, the running the code may include performing an AJAX call in the background to request the predefined web page and may be transparent to a user of the client device.

At operation 716, information associated with the access of the client device to the predefined web page may be logged. For example, a web server hosting the predefined web page may record information associated with an HTTP request received in association with the access of the predefined web page.

At operation 718, a detection service may detect whether a condition associated with the access may be violated based at least in part on the information. The detection service may be implemented at a service provider computing device, such as the web server hosting the pre-defined web page or some other computing device. In an example, the detection service may parse the HTTP request to determine whether a referrer header may exist. The condition may indicate that no such header should be found. If a referrer header exists, the detection service may determine that the condition may be violated.

Turning to the example sub-flow 700B, that sub-flow may start at operation 720 where a client device may execute a local application configured to access the above described pre-defined web page. The application may be similarly configured to the application 540 described in FIG. 5. Various parameters may be used to trigger the execution of the application. For example, upon a web request to the web site or to any monitored or unmonitored web site, the application can be executed. In another example, the application can run in the background of the client device and be executed at various time intervals. In yet another example, the application can run a hash check as further described in FIGS. 10 and 11. The result may trigger the application to perform the web request check.

At operation 722, the client device may access the predefined web page. For example, the executed application may cause the client device to submit a web request (e.g., a HTTP request) to the pre-defined web page, thereby retrieving this web page from the web server.

At operation 724, the client device may send information associated with the access to a service provider computing device over, for example, an out-of-band channel. The information may include data from the HTTP request. For instance, this information may include a 302 status if a redirection occurred. Operation 724 may be followed by operation 718, similarly to what is described herein above. For example, a detection service implemented at the service provider computing device may analyze the received information to determine whether a condition is violated. Here, the condition may indicate that a 302 status should not be found. If a 302 status exists, the detection service may determine that the condition may be violated.

Turning to the sub-flow 700C, that sub-flow may start at operation 730. Operation 730 may include, similar to operation 720, a client device executing a local application configured to access the above described pre-defined web page. At operation 732, and similar to operation 722, the client device may access the pre-defined web page.

At operation 734, the client device may locally retrieve information associated with the access. For example, the executed application may cause the client device to store information about a web request (e.g., a HTTP request) in local storage. A detections service implemented on the client device, within or independent of the local application, may then access the stored information for further analysis. Operation 734 may be followed by operation 718, similarly to what is described herein above. For example, the local detection service may analyze the retrieved information to determine whether a condition is violated. Here, the condition may indicate that a 302 status should not be found. If a 302 status exists, the detection service may determine that the condition may be violated.

At operation 736, the client device may report an issue associated with the access over the out-band-channel to a service provider computing device. For example, in response to detecting that the condition may be violated, the client device may send an error message to the service provider computing device with an indication that a 302 status may exist and/or that a redirection may have occurred. This message may cause the service provider computing device to flag the client device as an at risk device, causing further corrective actions.

As such, by implementing the example flows of FIGS. 6 and 7, a service provider may effectively turn client devices into sensors for supporting the detection of access issues. As described, this could be achieved by using a combination of different techniques involving network-based requests such as web requests. In addition to such techniques, a detection service may also consider and analyze additional data. This data may be related to web requests. For example, the data can include cookies and certificates.

For example, when a client device is redirected for the first time through a third party proxy server, the third party may add a cookie such that to avoid adding a tag again when the client device is redirected in subsequent visits. This can be a case associated with, for instance, adding affiliate tags in a cookie stuffing attack. As such, the client device may receive a third party cookie. When the client device accesses the web site, the detection service may receive cookies associated with this access. These cookies may include, for instance, the third party cookie along with any other previously generated web site cookies. The detection service may then compare the cookies to a condition. For instance, the condition may define a certain format, content, or number of cookies. If more than one cookie is received, the detection service may detect an issue. Similarly, if the format of one of the cookies is different from what the web site uses, an issue may be detected. Further, if the content of one of the cookies lacks information used for the web site cookies or, otherwise, adds some information not used for the web site cookies, the detection service may also detect an issue.

In another example, when a client device is redirected through a third party proxy server, certificates may be used between the client device and the proxy server. This can be the case when, for instance, a transport layer security (TLS) protocol is used. In this case, the client device may receive a certificate of the proxy server part of a TLS handshake. In a configuration, the client device may locally detect whether a redirection occurred based on the received certificate. For instance, a detection service or another application (e.g., the application 540 of FIG. 5) implemented on the client device may compare the received certificate (or a hash thereof) to a certificate (or a hash thereof) of a web server hosting the web site. If there are mismatches, the client device may detect that an issue may exist. In another configuration, the client device may send the proxy server certificate (or a hash thereof) over, for instance, an-out-band channel to a service provider computing device implementing a detection service. That detection service may then compare this certificate (or hash) to the web server's certificate (or hash) and detect that an issue may exist.

Figure 8:
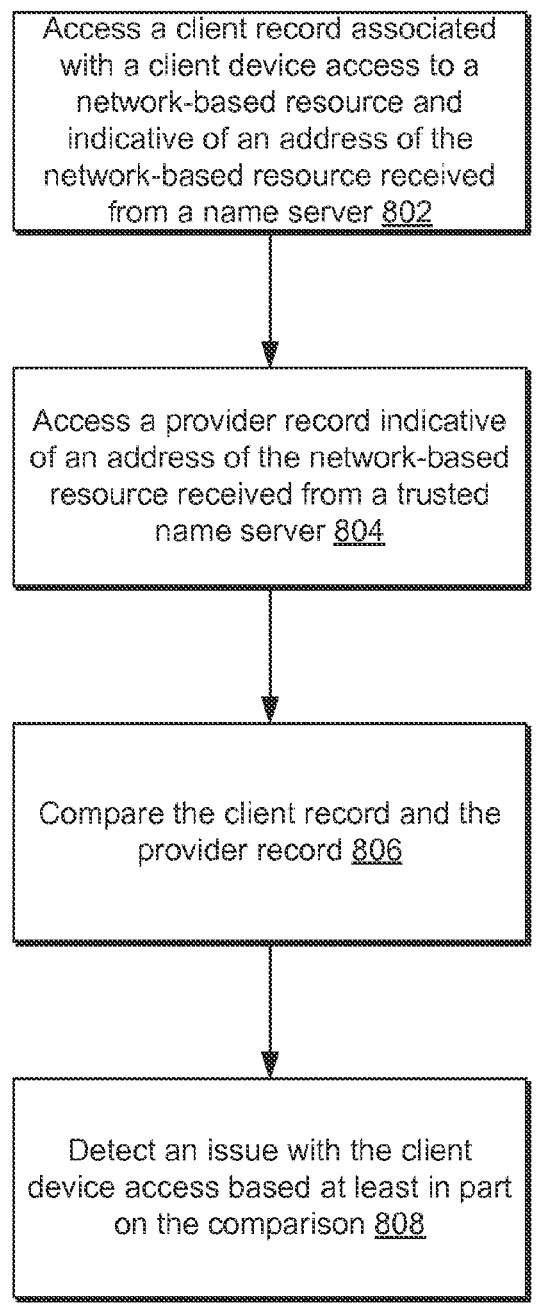
FIG. 8 illustrates an example flow for using a domain name system request to detect a change associated with accessing a network-based resource, according to embodiments.
Figure 9:
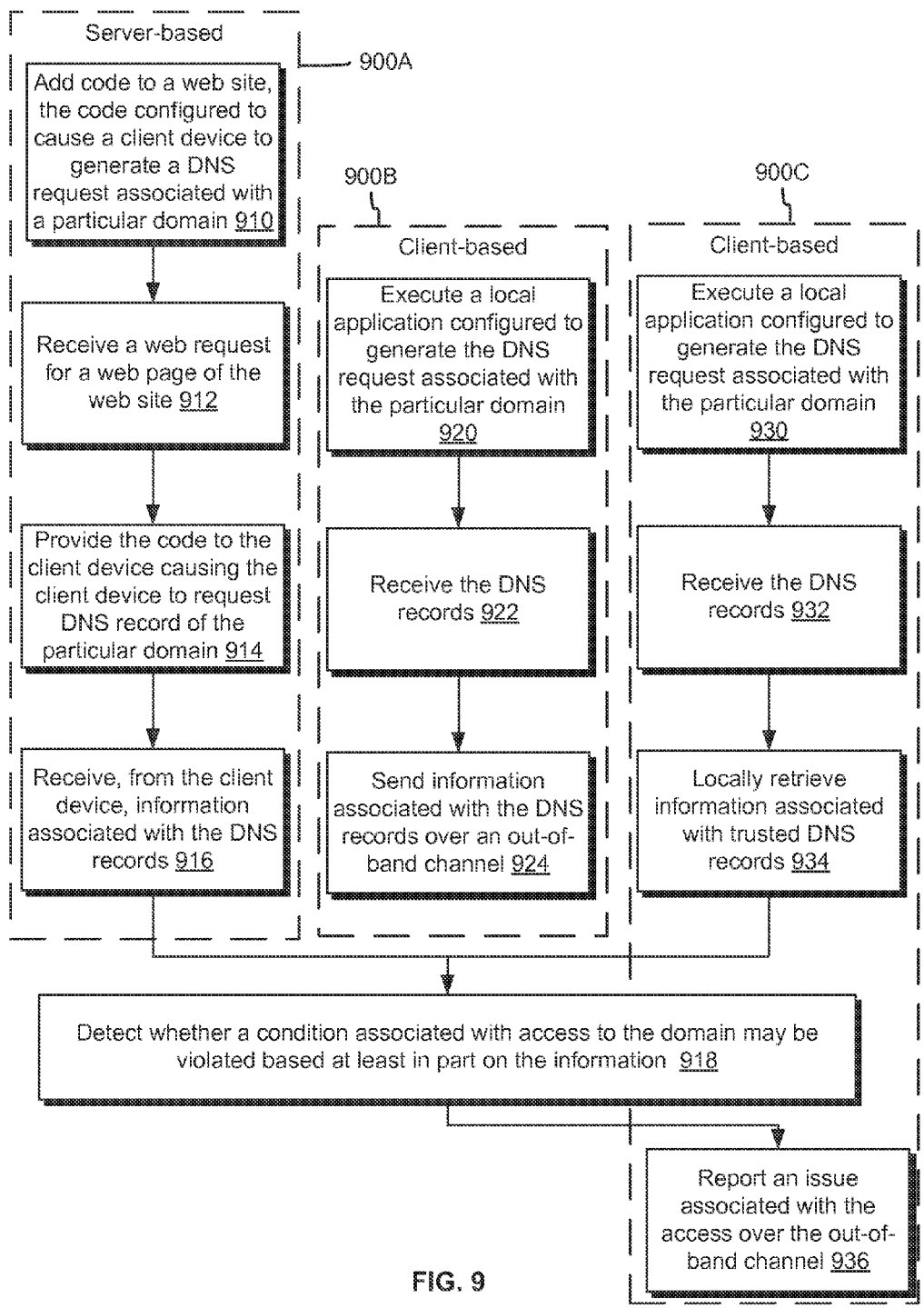
FIG. 9 illustrates an example flow for using a domain name system request by a client device or a network-based resource to detect a change a change associated with accessing a network-based resource, according to embodiments.

Turning to FIGS. 8-9, those figures illustrate example flows for using a DNS request to detect a change associated with accessing a network-based resource. FIG. 8 illustrates an example high-level flow for using DNS requests. In comparison, FIG. 9 illustrates a more detailed example flow for using web requests. Operations of the example flow of FIG. 8 may be further embodied in operations of the example flow of FIG. 9. Thus, some operations may be similar. Such similarities are not repeated herein in the interest of clarity of explanation.

Further, in the illustrative operations, each of the operations or functions may be embodied in, and fully or partially automated by, modules executed by one or more processor devices of a computing device. For example, a detection service executed on a service provider computing device, on a client device, or distributed between the service provider computing device and/or the client device is illustrated as performing certain operations of the flows. Nevertheless, other or a combination of other services and modules may be additionally or alternatively used. Also, while the operations are illustrated in a particular order, it should be understood that no particular order is necessary and that one or more operations may be omitted, skipped, and/or reordered.

The example flow of FIG. 8 may start at operation 802, where a detection service may access a client record associated with a client device access to a network-based resource such as a web site. This client record may include records associated with the network-based resource, such as DNS records of a domain of the web site. The client device may receive the client record from a server on the network, such as a name server operated by an ISP. This name server may be considered as an untrusted name server. The detection service may then access these records.

Accessing the client record may depend on whether the detection service is implemented on a service provider computing device or on the client device. In the first case, there may be a number of implementable configurations. For example, accessing the client record may include configuring the web site with an object (e.g., a flash object) such that, when the web site (e.g., a home page) is accessed by the client device (e.g., a web browser), the client device would also run the object, submit DNS request to the name server of the ISP, open a socket, and transmit the DNS records via the socket to the detection service. Additionally or alternatively, accessing the client record may include configuring an application on the client device such that, in conjunction with or independent of accessing the web site, the application can request and receive the DNS records. In turn, the DNS records can be transmitted over an out-of-band channel to the detection service. In the second case, the client device can locally access the DNS records received from the name server of the ISP.

At operation 804, the detection service may access a provider record indicative of an address of the network-based resource received from a trusted name server. The provider record may include records associated with the network-based resource, such as the DNS records of the domain of the web site. However, unlike the client record, the provider record may be received from a trusted name server rather than the name server of the ISP. The detection service may then access these records.

Accessing the provider record may also depend on whether the detection service is implemented on the service provider computing device or on the client device. In the first case, the service provider computing device may request the DNS records from a trusted name server. In the second case, there may be a number of implementable configurations. For example, accessing the provider record may include configuring the web site with an object (e.g., a flash object) such that, when the web site (e.g., a home page) is accessed by the client device (e.g., a web browser), the client device would also run the object, submit a DNS request to the trusted name server, and receive the provider record. Additionally or alternatively, accessing the provider record may include configuring an application on the client device such that, in conjunction with or independent of accessing the web site, the application can request and receive the DNS records from the trusted name server and/or can receive the DNS records from the service provider computing device over, for example, an out-of-band channel.

At operation 806, the detection service may compare the client record and the provider record. If there are no redirections or changes to the DNS records at the ISP name server, the two records should match. However, if there is a mismatch, the detection service may determine that a network-related issue may exist.

At operation 808, the detection service may detect an issue with the client device access based at least in part on the comparison. For example, if there is a mismatch, the detection service may determine that the records of the network-based resource may be altered. The detection service may flag the client device as an at risk device, causing a corrective action. Further, the detection service may further analyze the client record causing additional analysis to identify the third party.

Turning to FIG. 9, that figure illustrates another example flow for using DNS requests. The illustrated flow describes examples of DNS requests and is broken in three sub-flows indicated by the dashed lines. Sub-flow 900A illustrates various computing components of a service provider, such as a detection service, that may perform the related operations. In comparison, sub-flows 900B and 900C illustrate various computing components of a client, such as a detection service, that may perform the related operations. Sub-flows 900A-C may be performed independently of each other or in conjunction.

The example sub-flow 900A may start at operation 910, where code configured to cause a client device to generate a DNS request associated with a particular domain may be added to a web site. The domain may be a domain of the web site, or some other monitored web site. The code may include an object as illustrated in FIG. 4. For example, when the web site is accessed from the client device or an application thereof, the code may cause the client device or the application to perform various functions related to the DNS request. One, the generated DNS request can be for a domain name and a host name of the web site. Two, if an out-of-band channel is not available to the client device, the object may open a socket to allow DNS records, received in response to the DNS request, to be provided from the client device to the detection service.

At operation 912, a web request for a web page of the web site may be received. For example, the web request may include an HTTP request from the client device to access a home page, or some other page, of the web site.

At operation 914, the code may be provided to the client device causing the client device to submit the DNS request associated with the particular domain to a name server of an ISP. For example, in response to the HTTP request, the requested web page along with the code may be transmitted to the client device. When the client device (e.g., a web browser) renders the requested web page, the code may also be run. This may cause the client device (e.g., the web browser) to receive the DNS records from the name server of the ISP (if not already received independently of the object), including records of the host name and domain name, and/or open the socket.

At operation 918, information associated with the DNS records may be received. For example, a detection service implemented on a service provider computing device may receive from the client device the DNS records over an out-of-band channel or over an in-band-channel by way of the socket.

At operation 918, the detection service may detect whether a condition associated with the DNS record may be violated based at least in part on the information. Several conditions may be used to allow different types of checks. For example, the detection service may compare the DNS records associated with the host name and domain name. If there is a mismatch or if these records do not resolve to an ASN associated with the domain, the detection service may determine that a DNS-related issue may exist. In another example, the detection service may access DSN records from a trusted name server and compare these records to the information received from the client. Here again, if there is a mismatch, the detection service may determine that a DNS-related issue may exist.

Turning to the example sub-flow 900B, that sub-flow may start at operation 920 where a client device may execute a local application configured to generate a DNS associated with a particular domain, similarly to what is described herein above. The application may be similarly configured to the application 540 described in FIG. 5. Various parameters may be used to trigger the execution of the application. For example, upon a web request to the web site or to any monitored or unmonitored web site, the application can be executed. In another example, the application can run in the background of the client device and be executed at various time intervals. In yet another example, the application can run a hash check as further described in FIGS. 10 and 11. The result may trigger the application to perform the DNS request check.

At operation 922, the client device may access the DNS records. For example, in response to submitting the DNS request to a name server of an ISP, the client device may receive the associated DNS records.

At operation 924, the client device may send information associated with the DNS records to a service provider computing device over, for example, an out-of-band channel. Operation 924 may be followed by operation 918, similarly to what is described herein above. For example, a detection service implemented at the service provider computing device may analyze the received information to determine whether a condition is violated.

Turning to the sub-flow 900C, that sub-flow may start at operation 930. Operation 930 may include, similarly to operation 920, a client device executing a local application configured to generate the DNS request associated with the particular domain. At operation 932, and similarly to operation 922, the client device may receive the DNS records from a name server of an ISP service provider.

At operation 934, the client device may locally retrieve information associated with trusted DNS records. For example, the client may receive the trusted DNS records from a service provider computing device over an out-of-band channel, where these records may have been generated from a trusted name server. In another example, the application can be further configured to request the DNS records from a specific trusted name server. Operation 934 may be followed by operation 918, similarly to what is described herein above. For example, the local detection service may analyze the retrieved information to determine whether a condition is violated.

At operation 938, the client device may report an issue associated with the access over the out-band-channel to the service provider computing device. For example, in response to detecting that the condition may be violated, the client device may send an error message to the service provider computing device with an indication of a DNS records mismatch. This message may cause the service provider computing device to flag the client device as an at risk device, causing further corrective actions.

As such, by implementing the example flows of FIGS. 8 and 9, a service provider may effectively turn client devices into sensors for supporting the detection of access issues. As described, this could be achieved by using a combination of different techniques involving DNS requests to untrusted and trusted name servers.

Figure 10:
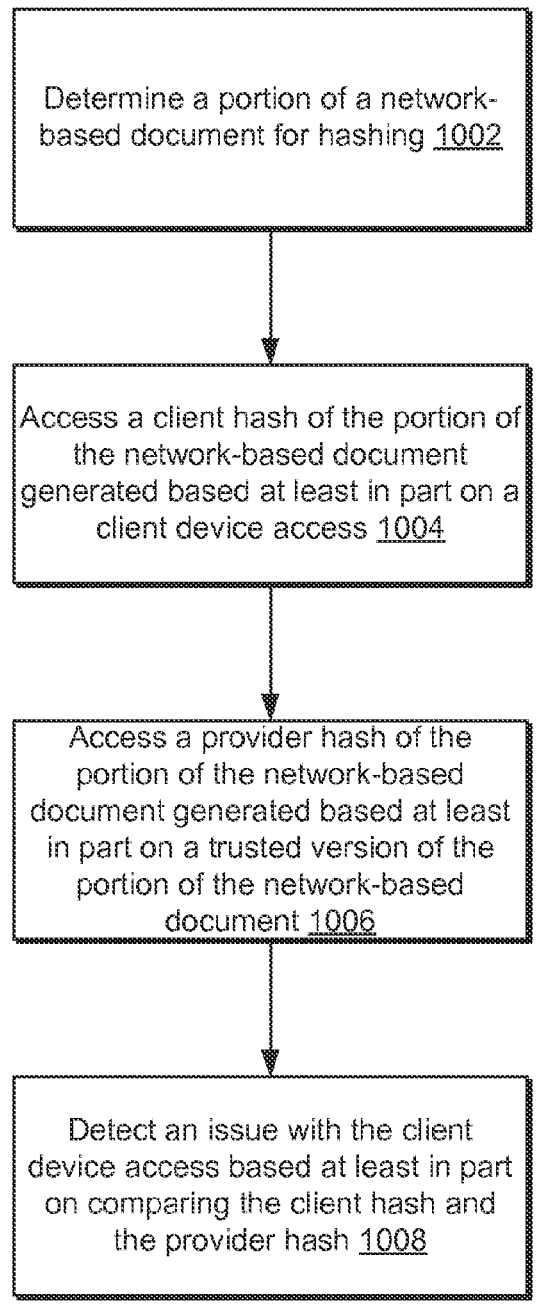
FIG. 10 illustrates an example flow for using a hash request to detect a change associated with accessing a network-based resource, according to embodiments.
Figure 11:
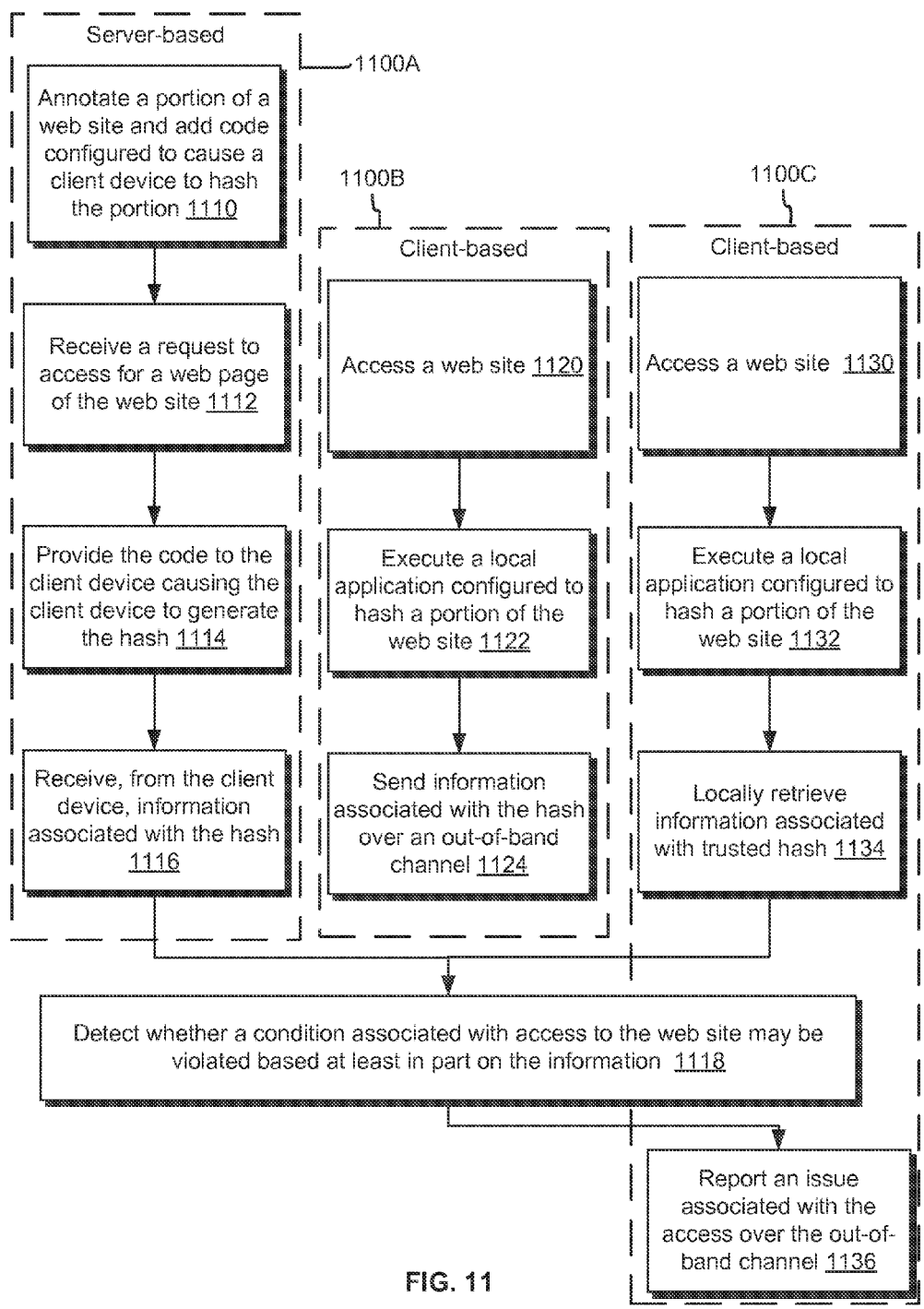
FIG. 11 illustrates an example flow for using a hash request by a client device or a network-based resource to detect a change a change associated with accessing a network-based resource, according to embodiments.

Turning to FIGS. 10-11, those figures illustrate example flows for using hash checks to detect a change associated with accessing a network-based resource. FIG. 10 illustrates an example high-level flow for using hash checks. In comparison, FIG. 11 illustrates a more detailed example flow for using hash checks. Operations of the example flow of FIG. 10 may be further embodied in operations of the example flow of FIG. 11. Thus, some operations may be similar. Such similarities are not repeated herein in the interest of clarity of explanation.

Further, in the illustrative operations, each of the operations or functions may be embodied in, and fully or partially automated by, modules executed by one or more processor devices of a computing device. For example, a detection service executed on a service provider computing device, on a client device, or distributed between the service provider computing device and/or the client device is illustrated as performing certain operations of the flows. Nevertheless, other or a combination of other services and modules may be additionally or alternatively used. Also, while the operations are illustrated in a particular order, it should be understood that no particular order is necessary and that one or more operations may be omitted, skipped, and/or reordered.

The example flow of FIG. 10 may start at operation 1002, where a portion of a network-based document may be determined for hashing. For example, a web browser or some other application running on a client device may access a web page and determine which portion of the web page to hash. This determination may be made based on annotations included in HTML code of the web page. Additionally or alternative, the browser or application may be preconfigured to hash the portion of the web page absent the annotations. For example, the browser or application can look for certain fields, such as login, header, footer, or some other fields of the web page that may be static and may not be change in association with presenting the web page at different client devices.

At operation 1004, a detection service may access a hash of the portion of the network-based document. The client hash may be generated based on the client accessing the network-based document. For example, once the web page is received at the client device, the browser or application may be configured to hash the determined portion. This hash may represent an untrusted hash because of using an untrusted process (e.g., access over a public network facilitated by an ISP) to generate the hash.

Accessing the client hash may depend on whether the detection service is implemented on a service provider computing device or on the client device. In the first case, the service provider computing device may receive the client hash from the client device over, for example, an out-of band channel. Additionally or alternatively, the code of the web page may include an object than, when run on the client device, may cause a socket to be opened and used to send the client hash. In the second case, the browser or application may store the client hash locally for access by the detection service.

At operation 1006, the detection service may access a provider hash of the portion of the network-based document. The provider hash may have been generated based at least in part on a hashing a trusted version of the portion of the network-based document. For example, the service provider computing device may run an application that can generate the hash in a trusted process. This hash may represent a trusted hash because of using the trusted process.

Accessing the provider hash may also depend on whether the detection service is implemented on the service provider computing device or on the client device. In the first case, the service provider computing device may locally store the provider hash. In the second case, the client device may receive the trusted hash from the service provider computing device over the out-band-channel or using the socket. Additionally or alternatively, the provider hash may be embedded in the HTML code of the web page. In this example, the client device may retrieve the provider hash from the HTML code.

At operation 1008, the detection service may detect an issue with the client device access based at least in part on comparing the client hash and the provider hash. In other words, the detection may compare the two accessed hashes and, if mismatches are found, may detect that a network-related issue may exist in association with accessing the network-based document. The detection service may flag the client device as an at risk device, causing a corrective action. Further, the detection service may trigger additional analysis by, for example, initiating a web request check or DNS request check as illustrated in FIGS. 6-9.

Turning to FIG. 11, that figure illustrates another example flow for using a hash check. The illustrated flow describes examples of hash checks and is broken in three sub-flows indicated by the dashed lines. Sub-flow 1100A illustrates various computing components of a service provider, such as a detection service, that may perform the related operations. In comparison, sub-flows 1100B and 1100C illustrate various computing components of a client, such as a detection service, that may perform the related operations. Sub-flows 1100A-C may be performed independently of each other or in conjunction.

The example sub-flow 1100A may start at operation 1110, where a portion of a web site may be annotated. The portion may represent a static portion of a web page that may not change when presented at different client devices. in addition, code configured to cause a client device to hash the portion may be added to the HTML code of the web site. For example, the added code may be an object that when, run on the client device, can cause the client device to hash the portion. In embodiment, the added code can use the annotations to determine the portion that should be hashed. Additionally or alternatively, the hashing can occur independent or without the need to annotate the portion of the web page. Instead, the added code may specify static portions of the web page that should be hashed, such as login, header, footer, and/or some other portions of the web page.

At operation 1112, a request for a web page of the web site may be received. For example, the request may include an HTTP request from the client device to access a home page, or some other page, of the web site.

At operation 1114, the code may be provided to the client device causing the client device to generate the hash. For example, the client device may run the code and, accordingly, hash the portion of the web page.

At operation 1116, information associated with the hash may be received. For example, a detection service implemented on a service provider computing device may receive from the client device the hash over an out-of-band channel or over an in-band-channel by way of the socket.

At operation 1118, the detection service may detect whether a condition associated with the hash may be violated based at least in part on the information. For example, the detection service may compare the received hash to a trusted hash. The trusted hash may be generated based on a trusted version of the portion of the web page. If there are mismatches between the hashes, the detection service may determine that a network-related issue may exist.

Turning to the example sub-flow 1100B, that sub-flow may start at operation 1120 where a client device may access a web site. This access may include receiving and presenting a web page of the web site.

At operation 1122, the client device may execute a local application configured to hash a portion of the web site. For example, the application may be configured to hash a static portion of the HTML code of the web page or of some other web page. The application may be similarly configured to the application 540 described in FIG. 5.

At operation 1124, the client device may send information associated with the hash to a service provider computing device over, for example, an out-of-band channel or a socket opened over an in-band channel. Operation 1124 may be followed by operation 1118, similarly to what is described herein above. For example, a detection service implemented at the service provider computing device may analyze the received information to determine whether a condition is violated.

Turning to the sub-flow 1100C, that sub-flow may start at operation 1130. Operation 1130 may include, similarly to operation 1120, a client device accessing a web site. At operation 1132, and similarly to operation 1122, the client device may execute a local application configured to hash a portion of the web site.

At operation 1134, the client device may locally retrieve information associated with a trusted hash of the portion of the web site. For example, the trusted hash may be generated by a service provider computing device using a trusted version of the portion of the web site or some other trusted process. The client may receive the trusted hash from the service provider computing device over an out-of-band channel or through a socket. In another example, the HTML code of the web site may include the trusted hash. Thus, by accessing the web site, the client device may also retrieve the trusted code. Operation 1134 may be followed by operation 1118, similarly to what is described herein above. For example, a local detection service implemented on the client device may compare the two hashes to determine whether a condition is violated, such as whether mismatches may exist between the two hashes.

At operation 1136, the client device may report an issue associated with the access over the out-band-channel to the service provider computing device. For example, in response to detecting that the condition may be violated, the client device may send an error message to the service provider computing device with an indication of a hash mismatch. This message may cause the service provider computing device to flag the client device as an at risk device, causing further corrective actions.

As such, by implementing the example flows of FIGS. 10 and 11, a service provider may effectively turn client devices into sensors for supporting the detection of access issues. As described, this could be achieved by using a combination of different techniques involving checks of trusted and untrusted hashes.

Figure 12:
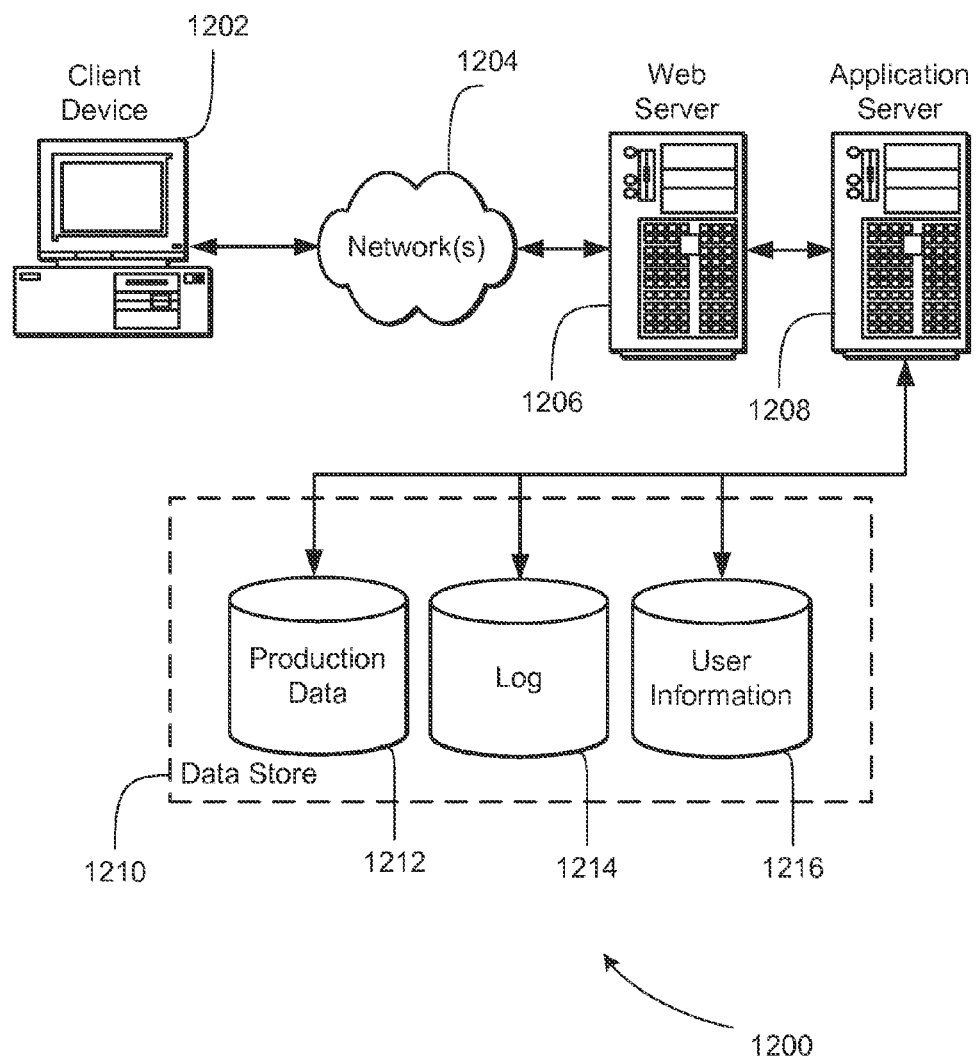
FIG. 12 illustrates an environment in which various embodiments can be implemented.

Turning to FIG. 12, the figure illustrates aspects of an example environment 1200 capable of implementing the above-described structures and functions. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network(s) 1204 and convey information back to a user of the device. Examples of such client devices include personal computers, cell phones, handheld messaging devices, laptop computers, set-top boxes, personal data assistants, electronic book readers, or any other computing device. The network(s) 1204 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, and the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server 1208 provides access control services in cooperation with the data store 1210, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 1202 and the application server 1208, can be handled by the Web server 1206. It should be understood that the Web and application servers 1206 and 1208 are not required and are merely example components, as structured code discussed herein can be executed on any appropriate device or host machine as discussed elsewhere herein, The data store 1210 can include several separate data tables, databases or other data storage mechanisms and media for storing data relating to a particular aspect. For example, the data store 1210 illustrated includes mechanisms for storing production data 1212 and user information 1216, which can be used to serve content for the production side. The data store 1210 is also shown to include a mechanism for storing log data 1214, which can be used for reporting, analysis, or other such purposes. It should be understood that there can be many other aspects that may need to be stored in the data store 1210, such as for page image information and to access correct information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of environment 1200 in FIG. 12 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications, User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
providing, by a computer system to a client device, a network-based document comprising an annotated portion and an object, the object configured to cause the client device to hash the annotated portion of the network-based document based at least in part on an access of the client to the network-based document over a data network, the access facilitated based at least in part on a domain name system record of the network-based document, the domain name system record available from a recursive name server of an Internet service provider;
receiving, from the client device, a client hash of the annotated portion of the network-based document based at least in part on an instantiation of the object by the client device;
generating, by the computer system, a trusted hash based at least in part on hashing a trusted version of the annotated portion of the network-based document;
comparing, by the computer system, the client hash and the trusted hash;
determining, based at least in part on the comparing, that the access of the client device to the network-based document involved an unauthorized redirection to the network-based document through the data network;
generating a flag indicative of the unauthorized redirection;
determining whether a number of unauthorized redirections through the data network exceeds a threshold based at least in part on the flag; and
determining that the domain name system record of the network-based document available from the recursive name server of the Internet service provider has been altered based at least in part on the number of unauthorized redirections exceeding the threshold.

2. The computer-implemented method of claim 1, wherein the network-based document comprises a web page, wherein the annotated portion comprises annotations of a static portion of the web page, and wherein the object is configured to determine that the static portion is to be hashed based at least in part on the annotations.

3. The computer-implemented method of claim 1, wherein the domain name system record comprises a network address associated with the network-based document, and wherein determining that the access of the client device to the network-based document involved the unauthorized redirection comprises determining that the provided network address is altered to redirect the client device to an unauthorized proxy server.

4. The computer-implemented method of claim 3, wherein the network-based document comprises a web page, and further comprising:
receiving client hashes associated with access of a plurality of client devices to the network-based resource;
identifying mismatches between the client hashes and the trusted hash; and
detecting that an unauthorized change to the domain name system record occurred at the recursive name server based at least in part on the mismatches.

5. One or more non-transitory computer-readable storage media storing computer-executable instructions that, when executed by one or more computing systems, configure the one or more computing systems to perform operations comprising:
identifying a portion of a network-based document for hashing; accessing a client hash of the portion of the network-based document, the client hash generated based at least in part on an access of a client device to the network-based document and received from the client device based at least in part on data communication between at least a computing system of the one or more computing systems and the client device, the access of the client device to the network-based document facilitated based at least in part on a domain name system record stored at a computing resource of an Internet service provider;
accessing a provider hash of the portion of the network-based document, the provider hash generated based at least in part on an access of at least a computing system of the one or more computing systems to a trusted version of the portion of the network-based document;
comparing the client hash and the provider hash;
determining that the client device was redirected to the network-based document based at least in part on the comparison of the client hash and the provider hash;
determining a number of unauthorized redirections of accesses of client devices to the network-based document based at least in part on comparisons of client hashes and the provider hash; and
detecting that the domain name system record has been altered based at least in part on the number of unauthorized redirections exceeding a threshold.

6. The one or more non-transitory computer-readable storage media of claim 5, wherein the portion of the network-based document comprises one or more static portions of the network-based document.

7. The one or more non-transitory computer-readable storage media of claim 5, wherein the portion of the network-based document is identified based at least in part on an annotation of the portion.

8. The one or more non-transitory computer-readable storage media of claim 7, wherein the access by the client device is associated with a request for the network-based document from the client device, and wherein the network-based document comprises an object configured to cause the client device to generate the client hash based at least in part on the annotation.

9. The one or more non-transitory computer-readable storage media of claim 8, wherein the access of the client to the network-based document is facilitated based at least in part on a recursive name server of the Internet service provider storing the domain name system record, and wherein the provider hash is generated based at least in part on the access of the at least computing system to the trusted version of the portion of the network-based document independently of the recursive name server of the Internet service provider.

10. The one or more non-transitory computer-readable storage media of claim 5, wherein the client hash is received over an out-of-band channel, the out-of-band channel configured to facilitate data communication between the client device and a control plane of the one or more computing systems, and wherein an in-band-channel is configured to facilitate communication between the client device and a data plane of the one or more computing systems to access the client-based document.

11. The one or more non-transitory computer-readable storage media of claim 5, wherein the one or more computing systems comprises the client device, wherein the operations further comprise transmitting information about the client device being redirected to a computing device of a provider of the network-based document based at least in part on a mismatch between the client hash and the provider hash.

12. The one or more non-transitory computer-readable storage media of claim 5, wherein the one or more computer systems comprise a computing device of a provider, and wherein accessing the provider hash comprises receiving the provider hash from the computing device of the provider.

13. The one or more non-transitory computer-readable storage media of claim 5, wherein the provider hash is embedded in the network-based document.

14. The one or more non-transitory computer-readable storage media of claim 5, wherein identifying the portion of the network-based document for hashing comprises receiving an identifier of the portion from a computing device of a provider of the network-based document, wherein the operations further comprise providing the identifier to the client device over an out-of-band channel, and wherein the client hash is generated based at least in part on the identifier.

15. A system, comprising:
a memory configured to store computer-executable instructions; and
a processor configured to access the memory and execute the computer-executable instructions to collectively at least:
provide a network-based document, the network-based document accessible to a client device over a network based at least in part on a domain name system record stored at a computing resource of an Internet service provider;
access a client hash of a portion of the network-based document, the portion identified based at least in part on an annotation associated with the portion, and the client hash generated based at least in part on an access of the client device to the network-based document over the network and received from the client device;
access a trusted hash of the portion of the network-based document, the trusted hash generated based at least in part on an access of the system to a trusted version of the portion of the network-based document;
compare the client hash and the trusted hash;
determine, based at least in part on the comparison of the client hash and the trusted hash, that the access of the client device to the network-based document comprises a redirection to the network-based document;
determine a number of unauthorized redirections of accesses of client devices to the network-based document based at least in part on comparisons of client hashes and the trusted hash; and
detect that the domain name system record has been altered based at least in part on the number of unauthorized redirections exceeding a threshold.

16. The system of claim 15, wherein the network-based document is provided to the client device, and wherein the computer-executable instructions, when executed by the processor, further configure the system to at least identify that the client device is an at risk device based at least in part on the determination that the access of the client device comprised the redirection.

17. The system of claim 15, wherein the computer-executable instructions, when executed by the processor, further configure the system to at least:
receive the client hashes associated with the accesses of the client devices to the network-based document over the network;
compare the client hashes to the trusted hash; and
determine that the redirection of the client device comprises an unauthorized change in traffic to a network-based resource hosting the network-based document based at least in part on the comparison of the client hashes to the trusted hash, the unauthorized change occurring at a computing resource of the Internet service provider.

18. The system of claim 17, wherein the unauthorized change comprises a change to the domain name system record stored at the computing resource of the Internet service provider, the domain name system record configured to provide an address of the network-based resource to the client devices.

19. The system of claim 15, wherein the computer-executable instructions, when executed by the processor, further configure the system to at least:
record, based at least in part on the determination of the redirection of the client device, information associated with the client device accessing another network-based document, the other network-based document configured to be accessible to the client device without redirection;
determine that the information comprises data indicative of a second redirection to the other network-based document; and
confirm the determination of the redirection of the client based at least in part on the second redirection.

20. The system of claim 15, wherein the computer-executable instructions, when executed by the processor, further configure the system to at least:
access, based at least in part on determining the redirection, the domain name system record, wherein the domain name system record is generated based at least in part on the access of the client device to the network-based document;
access a trusted domain name system record generated based at least in part on a domain name system request to a trusted name server; and
confirm the determination of the redirection based at least in part on a comparison of the domain name system record and the trusted domain name system record.

* * * * *